United States Patent [19]
Stewart et al.

[11] Patent Number: 5,687,562
[45] Date of Patent: Nov. 18, 1997

[54] BYPASS AIR VALVE FOR TURBOFAN ENGINE

[75] Inventors: Jeffrey B. Stewart, Palm Beach Gardens; Alan B. Minick, Stuart, both of Fla.

[73] Assignee: United Technologies Corporation, Hartford, Conn.

[21] Appl. No.: 496,995

[22] Filed: Jun. 30, 1995

[51] Int. Cl.$^6$ .......................................................... F02K 3/04
[52] U.S. Cl. .......................... 60/226.3; 60/262; 60/39.07; 251/304; 251/345; 415/150
[58] Field of Search ............................ 60/39.07, 226.3, 60/262, 226.1; 137/625.31; 251/95, 160, 304, 345; 415/144, 145, 148, 150, 156

[56] References Cited

U.S. PATENT DOCUMENTS

| | | | |
|---|---|---|---|
| 3,127,909 | 4/1964 | Alamprese | 251/304 |
| 4,285,194 | 8/1981 | Nash. | |
| 4,344,282 | 8/1982 | Anders | 60/262 |
| 4,785,624 | 11/1988 | Smith | 60/39.07 |
| 4,813,229 | 3/1989 | Simmons. | |
| 4,958,489 | 9/1990 | Simmons. | |
| 4,961,312 | 10/1990 | Simmons. | |
| 5,136,840 | 8/1992 | Nash | 60/226.3 |
| 5,182,905 | 2/1993 | Stransky et al.. | |
| 5,211,007 | 5/1993 | Marvin. | |
| 5,287,697 | 2/1994 | Johnson et al. | 60/226.3 |
| 5,305,599 | 4/1994 | Marvin. | |
| 5,343,697 | 9/1994 | Johnson et al.. | |
| 5,381,655 | 1/1995 | Orlando. | |

*Primary Examiner*—Louis J. Casaregola
*Attorney, Agent, or Firm*—Richard D. Getz

[57] ABSTRACT

A bypass air valve is provided which includes a liner, a strap, apparatus for biasing the strap into contact with the liner, a selective actuator, and apparatus for passage of bypass air. To open and close the valve, the selective actuator unwraps a segment of the strap from the liner before the strap is translated a distance around the circumference of the liner. The biasing apparatus biases the strap back into contact with the liner.

16 Claims, 5 Drawing Sheets

5,687,562

BYPASS AIR VALVE FOR TURBOFAN ENGINE

The invention was made under a U.S. Government contract and the Government has rights herein.

BACKGROUND OF THE INVENTION

1. Technical Field

This invention applies to gas turbine engines in general, and to bypass air valves in particular.

2. Background Information

The amount of thrust produced by a gas turbine engine may be described in terms of the "power setting" of the engine. In the case of a gas turbine driven aircraft, higher power settings can provide additional thrust when necessary to satisfy aircraft performance requirements. Increasing power settings, however, increases core gas flow temperatures, and consequent cooling requirements within the engine. To satisfy the cooling requirements, inlet air is pressurized, separated from the core gas flow and subsequently bled into the core gas flow at various positions within the engine. The work of pressurizing the inlet air (also known as "bypass air") is lost as the air passes from one or more bypass ducts, through cooling apertures, and into the core gas flow. Hence, the efficiency of the engine is effected by the amount of inlet air used for cooling purposes.

Bypass air selectively introduced into the core gas flow through bypass air valves can minimize the work lost during cooling. At lower power settings, cooling requirements are less and bypass air may be "dumped" through less restrictive bypass air valves rather than the more restrictive aforementioned cooling apertures. Currently available bypass air valves are not without problems, however. Peak power settings necessitate large amounts of bypass air be used to cool the engine. A bypass air valve that allows more bypass air through the valve than is necessary to cool the valve in the closed position, decreases downstream cooling capacity and therefore the engines ability to run at peak power.

In addition, thermal growth within the engine makes effective sealing a problem. A bypass air valve "loose" enough to accommodate thermal growth will likely leak significantly in the closed position and negatively effect the performance of the engine. A bypass air valve "tight" enough to seal, on the other hand, may bind as a result of thermal expansion or may require a significant actuation force due to friction and large normal forces between the strap and the liner. Normal forces can become rather large when the pressure forces acting against the strap are added to the forces resulting from the thermal expansion of the liner.

Complexity and weight are still further problems of some present bypass air valves. Flap valves, for example, have been designed which properly seal despite the harsh thermal environment, but do so at the cost of simplicity. Flap valve systems typically employ a plurality of flap valves disposed about the circumference of the liner, each requiring a flap, a hinge mechanism, and an actuating mechanism. A collective actuator is also required to ensure that all flaps operate in concert. Such a system, although operational, unnecessarily adds to the complexity and weight of the engine. Complexity is also generally inversely related to cost and reliability.

What is needed, therefore, is a lightweight, simple, bypass air valve that prevents bypass air from entering the core gas flow when closed, and which can be easily actuated into an open position, and which accommodates high thermal loads without adverse consequences.

DISCLOSURE OF THE INVENTION

It is an object of the present invention, therefore, to provide a bypass air valve that is simple and lightweight.

It is another object of the present invention to provide a bypass air valve that adequately accommodates high thermal loads with negligible thermal distortion and/or burnout.

It is still another object of the present invention to provide a bypass air valve that is easily actuated.

According to the present invention, a bypass air valve is provided which includes a liner, a strap, means for biasing the strap into contact with the liner, a selective actuator, and means for passage of bypass air. To open and close the valve, the selective actuator unwraps a segment of the strap from the liner before the strap is translated a distance around the circumference of the liner. The biasing means biases the strap back into contact with the liner.

An advantage of the present invention is that a simple and lightweight bypass air valve is provided. The liner, strap, and selective actuator of the present invention obviate the need for a plurality of doors and door actuating hardware. The strap and liner of the present invention are also simpler to manufacture and lighter in weight than most existing bypass air valves.

A further advantage of the present invention is that bypass air is uniformly introduced into the core gas flow. The present bypass air valve allows bypass air to be introduced around the entire circumference of the liner as opposed to the few discrete positions available when flaps are used. The more uniform distribution promotes improved thermal efficiency.

A still further advantage of the present invention is that the force required to actuate the bypass air valve is significantly reduced. The actuating force for a strap valve is exponentially related to the coefficient of friction and the degree of wrap between the strap and the liner. The present invention provides means for unwrapping a segment of the strap from the liner before translating the strap a distance about the circumference of the liner. Unwrapping the liner avoids friction between the strap and the liner for that segment of the strap. The actuating force is, therefore, exponentially less than it would be otherwise. A lighter, less robust, and less expensive actuating means can be utilized consequently.

A still further advantage of the present invention is that flow impediments within either the bypass air path or the core gas path are minimized. Flap-type bypass air valves generally extend one or more flaps into one of the bypass air or core gas paths and therefore impede flow within that path. A person of skill in the art will recognize that it is desirable to minimize most gas flow impediments.

These and other objects, features, and advantages of the present invention will become apparent in light of the detailed description of the best mode embodiment thereof, as illustrated in the accompanying drawings.

BRIEF DESCRIPTION OF THE DRAWINGS

FIG. 3A shows the valve in the closed position. FIG. 3B shows the valve being actuated toward the open position. FIG. 3C shows the valve in the open position. FIG. 3D shows the valve being actuated toward the closed position.

BEST MODE FOR CARRYING OUT THE INVENTION

Figure 1:
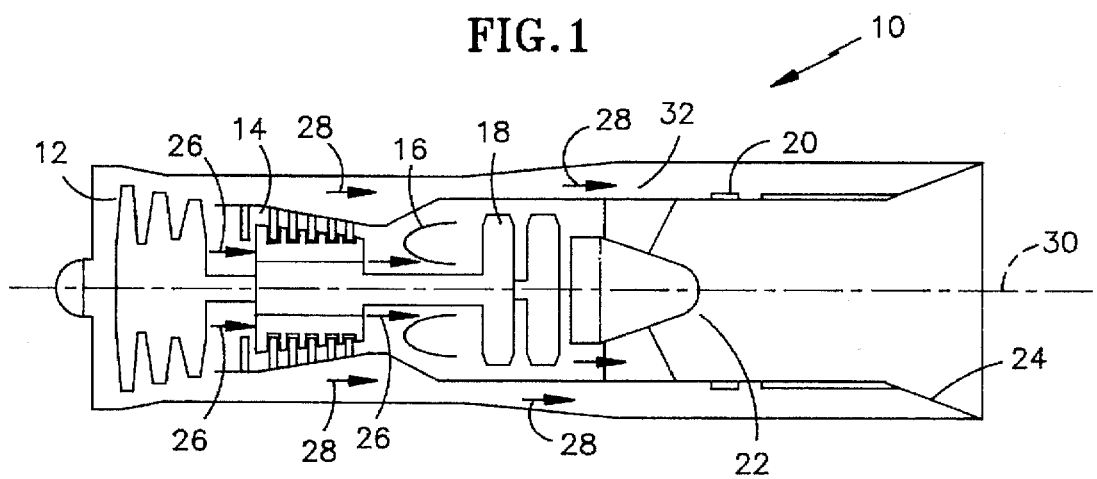
FIG. 1 is a diagrammatic view of a gas turbine engine.

Referring to FIG. 1, a gas turbine engine 10 may be described as having a fan 12, a compressor 14, a combustor 16, a turbine 18, a bypass air valve 20, an augmentor 22, and a nozzle 24. Air exiting the fan 12 is divided between core gas flow 26 and bypass air flow 28. Core gas flow 26 follows a path through the compressor 14, combustor 16, turbine 18, augmentor 22, and nozzle 24 in that order. Core gas flow 26 may, therefore, be described as following a path substantially parallel to the axis 30 of the engine 10. Bypass air 28 also follows a path parallel to the axis 30 of the engine 10, passing through an annulus 32 extending along the periphery of the engine 10. Aft of the turbine 18, bypass air flow 28 is at a higher pressure than core gas flow 26.

I. Elements of the Bypass Air Valve

Figure 2:
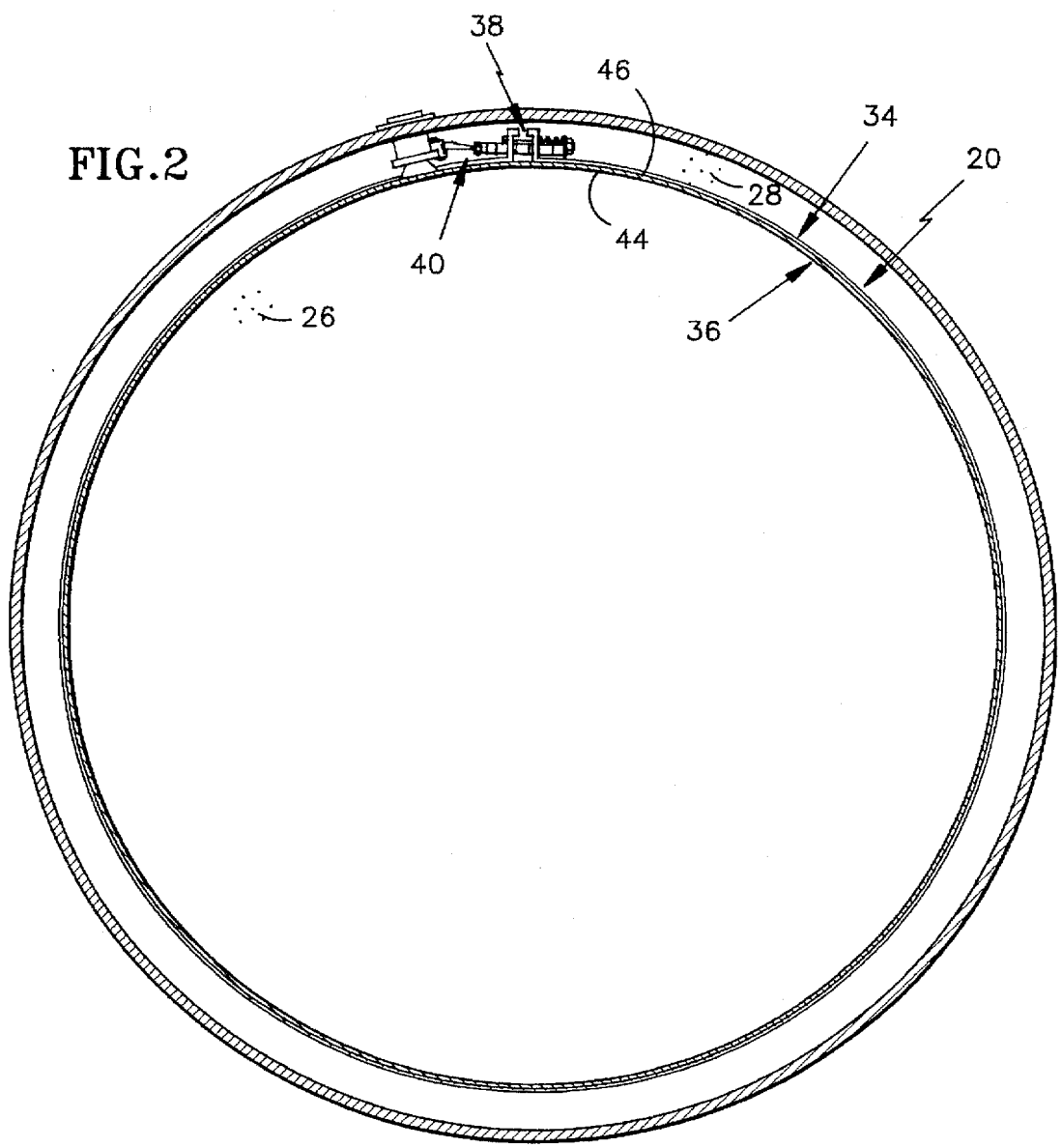
FIG. 2 is a diagrammatic view of the present invention bypass air valve.
Figure 3A:
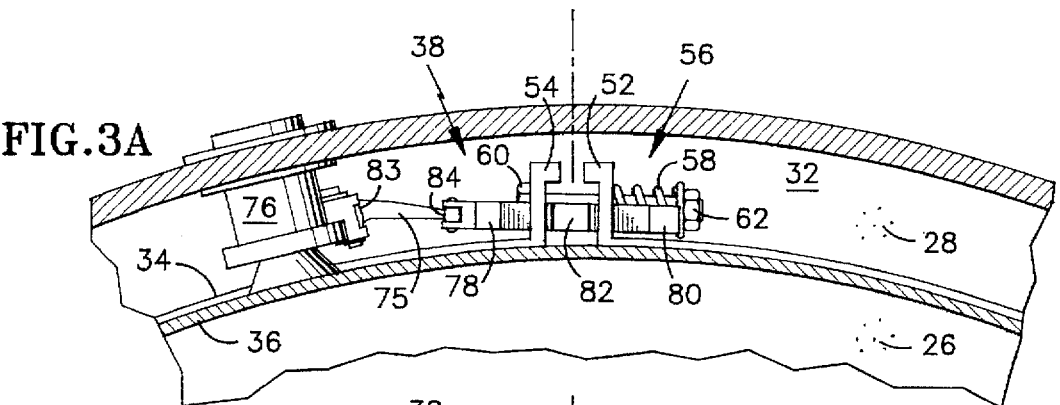
FIGS. 3A–3D are enlarged partial views of the present invention bypass air valve.
Figure 3B:
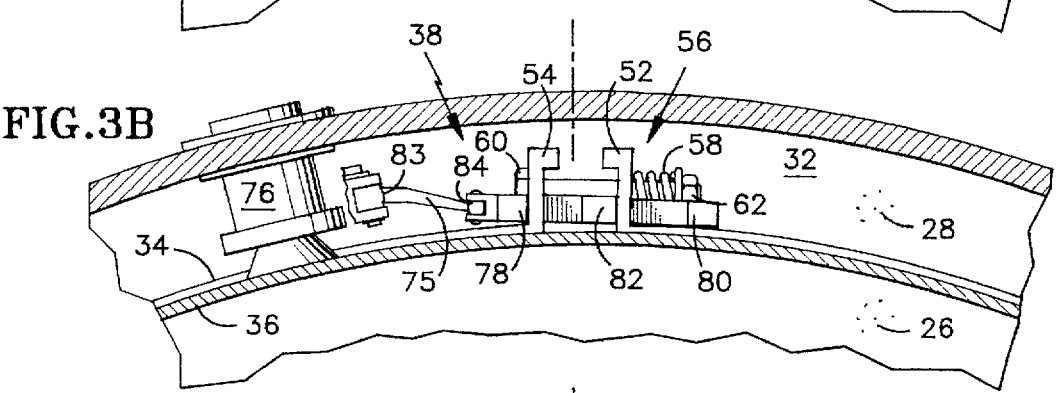
Figure 3C:
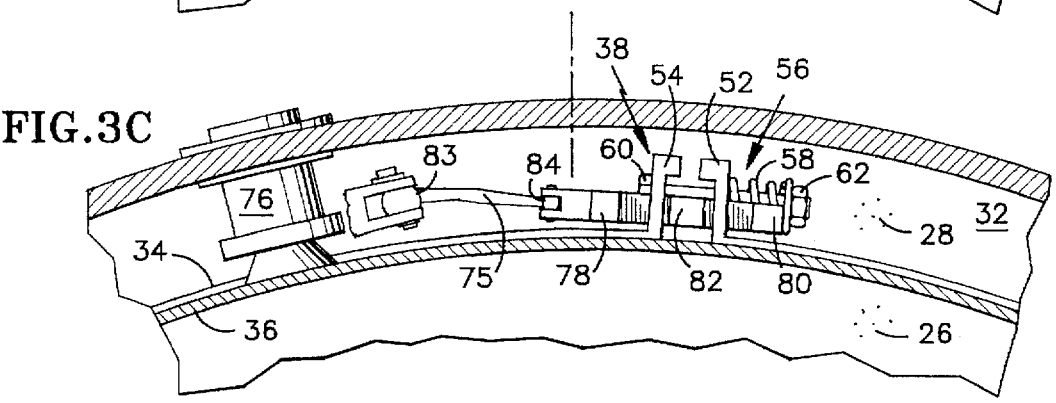
Figure 3D:
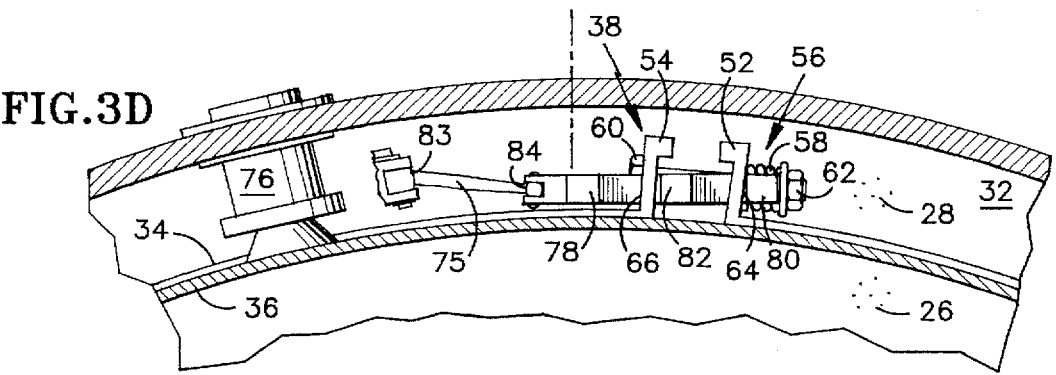
Figure 4:
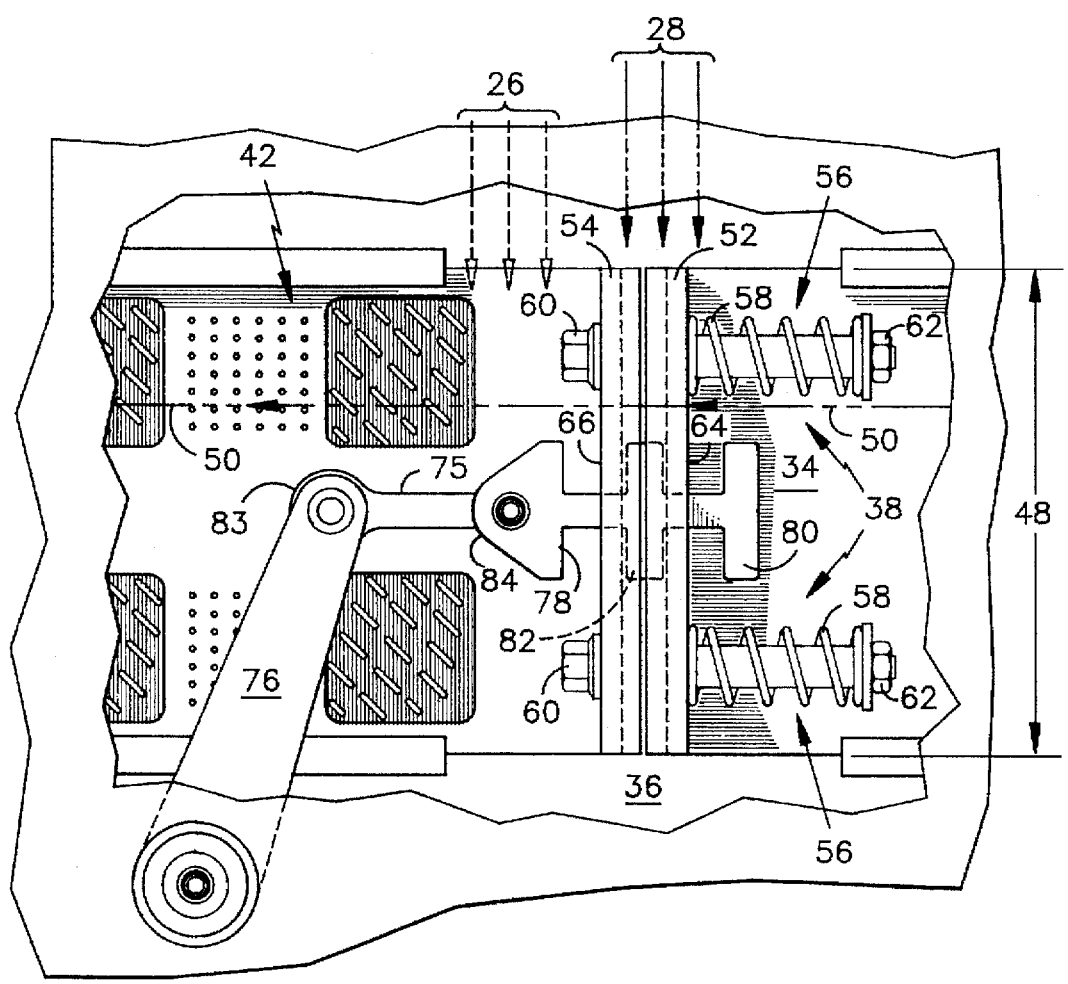
FIG. 4 shows a top view of FIG. 3A.
Figure 5:
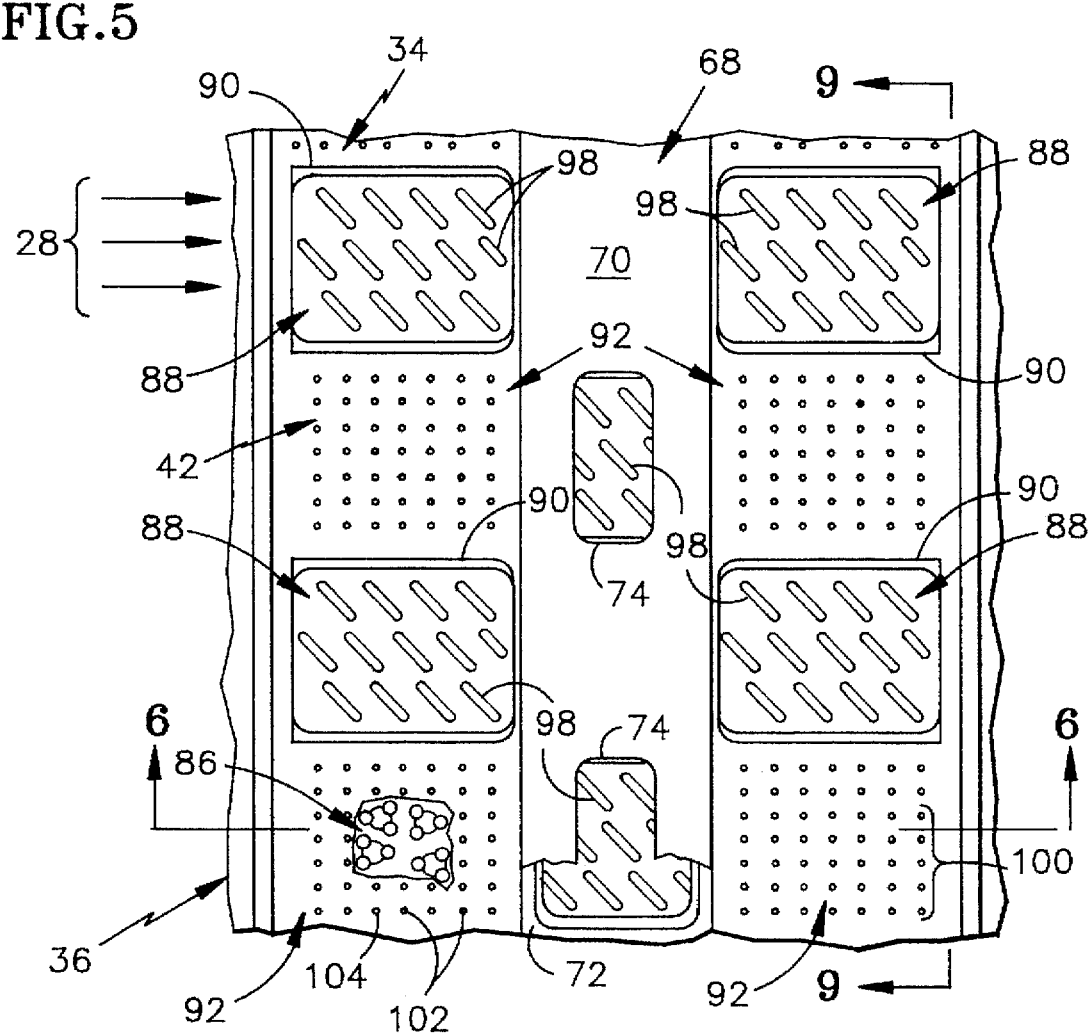
FIG. 5 shows a portion of the strap and liner of the present invention in the closed position.

FIGS. 2–4 show diagrammatic views of a bypass air valve 20. The bypass air valve 20 is positioned to receive bypass air 28 passing through the annulus 32. The bypass air valve 20 includes a strap 34, a liner 36, means 38 for biasing the strap 34 in contact with the liner 36, a selective actuator 40, and means 42 for the passage of bypass air 28 (see FIG. 4). The liner 36 includes an inner 44 and an outer 46 surface. The inner surface 44 is exposed to core gas flow 26. The strap 34 is formed in a ring having a width 48, a length 50, a first flange 52 attached to a lengthwise end of the strap 34, and a second flange 54 attached to the other lengthwise end of the strap 34.

Referring to FIGS. 3A–3D and 4, the means 38 for biasing the strap 34 in contact with the liner 36 includes a pair of spring assemblies 56. Each spring assembly 56 includes a spring 58, a bolt 60, and a nut 62. The bolt 60 extends through the spring 58 and through clearance holes in the first 52 and second 54 flanges. The spring 58 acts between the bolt\nut 60,62 assembly and the outer surface 64,66 of one of the flanges 52,54. FIGS. 3A–3D and 4 show the springs 58 acting between the nuts 62 and the outer surface 64 of the first flange 52.

Referring to FIGS. 5–9, the strap 34 may include a structural member 68 attached to the side of the strap 34 facing away from the liner 36. The structural member 68 includes an outer ring 70 and a corrugated ring 72. The corrugated ring 72 extends between the strap 34 and the outer ring 70 and is attached to both by conventional means. In the preferred embodiment, the outer ring 70 and the corrugated ring 72 include openings 74 to enhance bypass air 28 distribution in the area of the structural member 68.

Referring to FIGS. 3A–3D and 4, the selective actuator 40 includes an arm 75 and a driver 76. The arm 75 includes a first outer bar 78, a second outer bar 80, and a middle bar 82 disposed between the outer bars 78,80. The outer bars 78,80 are spaced equidistant from the middle bar 82. The first flange 52 of the strap 34 is disposed between the middle bar 82 and the second outer bar 80. The second flange 54 of the strap 34 is disposed between the middle bar 82 and the first outer bar 78. The end 83 of the arm 75 opposite the bars 78,80,82 is pivotly attached to the driver 76. The arm 75 further includes a joint 84 to accommodate any misalignment between the driver 76 and the strap 34.

Referring to FIGS. 5–8, the means 42 for passage of bypass air 28 includes a plurality of first 86 and second 88 regions disposed in the liner 36, and a plurality of openings 90 and third regions 92 disposed in the strap 34. FIGS. 5 and 6, and FIGS. 7 and 8 show the strap 34 and the liner 36 in the closed and open positions, respectively. Each of the first regions 86 includes a plurality of first apertures 94 extending through the liner 36 and counterbores 96 disposed within the outer surface 46 of the liner 36. In the preferred embodiment, the first apertures 94 are triangularly arranged in groups of three, with the groups aligned in parallel rows. A counterbore 96 is disposed within each group of three first apertures 94, overlapping each aperture 94. The second regions 88 include a plurality of fins 98 disposed in parallel rows, formed within the outer surface 46 of the liner 36. The third regions 92 include a plurality of second apertures 100 extending through the strap 34, arranged in parallel rows. The cross-sectional area of the openings 90 in the strap 34 is substantially the same as that of the first 86 or second 88 regions or larger.

In the preferred embodiment, the first 86 and second 88 regions in the liner 36 are arranged in a "checkerboard" pattern, where the first 86 and second 88 regions alternate both axially and circumferentially. Likewise, the third regions 92 and the openings 90 in the strap 34 are also arranged in a checkerboard pattern, where the third regions 92 and the openings 90 alternate axially and circumferentially.

II. The Bypass Air Valve in the Closed Position

Referring to FIGS. 5–8, in the operation of the bypass air valve 20, the valve 20 is normally closed which forces most of the bypass air 28 to continue downstream to cool the augmentor 22 and the nozzle 24 (see FIG. 1). In the closed position, the openings 90 within the strap 34 are aligned with and above the second regions 88 of the liner 36 and the third regions 92 of the strap 34 are aligned with and above the first regions 86 of the liner 36. The third regions 92 are aligned with the first regions 86 such that a row 102 of second apertures 100 lies between adjacent rows of first aperture 94 groups and a row 104 of second apertures 100 is aligned with each row of first aperture 94 groups. The strap 34 is biased in contact with the liner 36 by both the spring assemblies 56 (see FIG. 4) and the pressure difference across the liner 36 and strap 34. The spring assemblies 56 enable the valve 20 to accommodate disparate thermal growth between the strap 34 and the liner 36 without binding.

Figure 6:
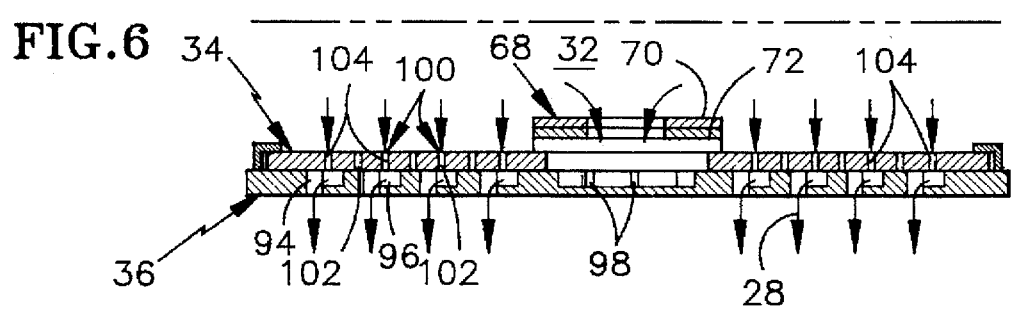
FIG. 6 is a cross-sectional view of FIG. 5.
Figure 7:
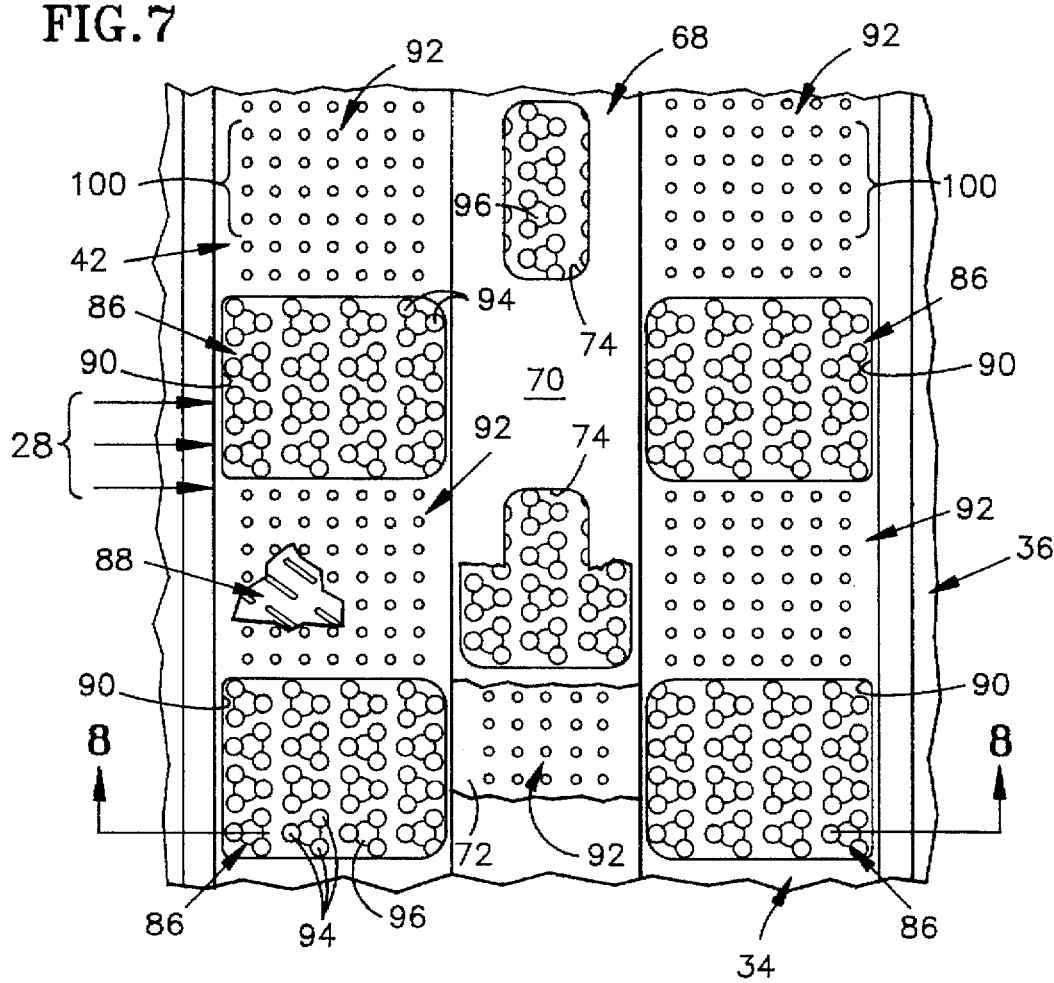
FIG. 7 shows a portion of the strap and liner of the present invention in the open position.
Figure 8:
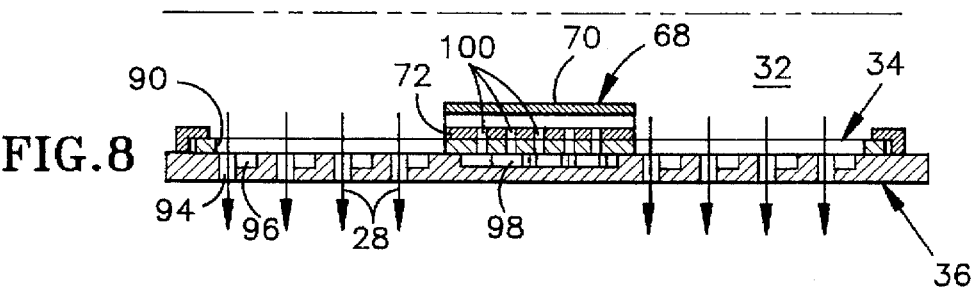
FIG. 8 is a cross-sectional view of FIG. 7.
Figure 9:
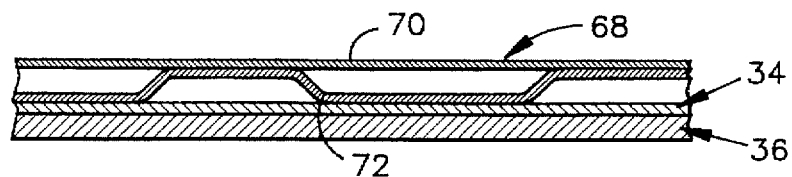
FIG. 9 is a cross-sectional view of FIG. 5.

In the closed position, some bypass air 28 traveling within the annulus 32 enters the openings 90 within the strap 34, and travels between the rows of fins 98 formed within the second regions 88. In the preferred embodiment, the fins 98 are oriented at a 45° angle relative to the bypass air flow 28 to enhance heat transfer from the fins 98 to the bypass air flow 28. Referring to FIG. 6, other bypass air 28 is drawn into the second apertures 100 by the pressure difference across the strap 34 and liner 36. A portion of the bypass air 28 drawn into second apertures 100 enters the rows 102 of second apertures 100 positioned between the rows of first aperture 94 groups. Normally, these second apertures 100 do not provide further passage for bypass air because the strap 34 and liner 36 are biased in contact with one another. In the event the strap 34 is thermally distorted and a gap (not shown) develops between the strap 34 and the liner 36, however, these second apertures 100 provide a flow path for auxiliary cooling of the liner 36 and thereby prevent hot gas influx and potential burnout. The remainder of the bypass air flow 28 entering the second apertures 100 enters those rows 104 aligned with the first aperture 94 groups. Bypass air 28 entering these rows 104 of second apertures 100 passes into the counterbores 96 and subsequently through the first apertures 94. As can be seen in FIG. 6, bypass air 28 must travel within the counterbores 96 before entering the first apertures 94 due to the misalignment of the first 94 and second 100 apertures. An advantage of deploying second apertures 100 in rows 104 is that some circumferential misalignment between the first aperture 94 groups and the second apertures is permissible. Specifically, the frequency of the second apertures 100 is great enough such that a sufficient number of second apertures 100 will always be aligned with each of the first aperture 94 groups.

The pressure difference between the bypass air flow 28 and the core gas flow 26, is discretely stepped across the strap 34 and across the liner 36. The discrete steps are made possible by the diameter of each second aperture 100 in the strap 34 being approximately five times smaller than the diameter of each first aperture 94 in the liner 36. The smaller second apertures 100 support a much larger pressure difference than do the larger first apertures 94. As a result, bypass air flow 28 "jets" into the counterbores 96 from the second apertures 100 and "bleeds" out of the first apertures 94. The bypass air 28 jets acting on the counterbores 96 create impingement cooling of the liner 36. The low pressure bleeding of the bypass air 28 from the first apertures 94 facilitates the formation of a boundary layer (not shown) along the inner surface 44 of the liner 36. The boundary layer of relatively cool bypass air 28 helps to thermally protect the liner 36 from the hot core gas flow 26 (see FIG. 1). The difference in diameter between the first 94 and second 100 apertures may be increased or decreased to alter the magnitude of the pressure steps across the strap 34 and liner 36.

The first 94 and second 100 apertures and counterbores 96 also compartmentalize flow through the valve 20. Flow 28 entering a counterbore 96 through one or more aligned second apertures 100 must exit the first apertures 94 in communication with that counterbore 96. As a result, the first apertures 94 have a positive flow of bypass air 28 exiting them despite having only a slight difference in pressure across them. The positive air flow through the first apertures 94 is particularly important in areas where the pressure distribution within the core gas flow 26 is irregular and at points may exceed the pressure of a local counterbore 96. In that instance, bypass air 28 will enter the counterbore 96 by virtue of the relatively large pressure difference across the strap 34, and increase in pressure until the pressure within the counterbore 96 exceeds the local pressure within the core gas flow 26. Hence, hot gas influx and potential burnout are avoided.

III. Actuating the Valve Toward the Open or Closed Position

Referring to FIGS. 3A–3D, when the valve 20 is actuated toward the open position, the driver 76 drives the arm 75 in a direction substantially tangential to the circumference of the liner 36. As a result, the middle bar 82 contacts the first flange 52 and drives a segment of the strap 34 out of contact with the liner 36 (see FIG. 3B). The length of the segment depends upon the stiffness of the strap 34 and the magnitude of the forces biasing the strap 34 against the liner 36. After the strap segment has been disengaged from the liner 36, the strap 34 will be translated by either the spring assemblies 56 drawing the second flange 54 in the same direction, or by the first outer bar 78 contacting the second flange 54. After the strap 34 is translated to the open position, the spring assemblies 56 and the pressure against the strap 34 will bias the strap 34 against the liner 36 (see FIG. 3C).

When the valve is actuated toward the closed position, the driver 76 drives the arm 75 in a direction opposite that taken to open the valve 20. In doing so, the middle bar 82 contacts the second flange 54 and drives a segment of the strap 34 out of contact with the liner 36 (see FIG. 3D). The strap 34 is subsequently translated by either the spring assemblies 56 drawing the first flange 52 in the same direction, or by the second outer bar 80 contacting the first flange 52. After the strap 34 is translated to the open position, the spring assemblies 56 and the pressure against the strap 34 bias the strap 34 against the liner 36 (see FIG. 3A).

IV. The Bypass Air Valve in the Open Position

In the open position, the openings 90 in the strap 34 are aligned with and above the first regions 86 in the liner 36, and the third regions 92 in the strap 34 are aligned with and above the second regions 88 in the liner 36. The openings 90 allow a large volume of bypass air 28 to pass directly through the first apertures 94 into the core gas flow 26. The distribution of first regions 86 around the circumference of the liner 36 enables bypass air 28 to be uniformly introduced into the core gas flow 26.

Although this invention has been shown and described with respect to the detailed embodiments thereof, it will be understood by those skilled in the art that various changes in form and detail thereof may be made without departing from the spirit and the scope of the invention. For example, the preferred arrangement of regions 86,88,92 and openings 90 within the means 42 for the passage of bypass air 28 is given as a checkerboard pattern. Other patterns may be used alternatively. A still further example is the preferred grouping of three first apertures 94 and a counterbore 96. More or less than three first apertures 94 could be used alternatively. A still further example is the structural member 68 attached to the strap 34. In alternative embodiments, the structural member 68 may include embodiments other than the preferred outer ring 70 and corrugated ring 72.

We claim:

1. A bypass air valve in a turbofan engine, comprising:
   a liner, having a circumference;
   a strap, surrounding said liner, having a width, a length, a first flange attached to a lengthwise end of said strap, and a second flange attached to the other lengthwise end of said strap;
   means for biasing said strap in contact with said liner, said biasing means attached to said strap;
   a selective actuator, for unwrapping a segment of said strap from said liner and circumferentially translating said strap a distance around said circumference of said liner; and
   means for passage of bypass air through said liner and said strap.

2. A bypass air valve according to claim 1, wherein said selective actuator comprises:
   an arm, said arm in communication with said strap; and
   a driver, attached to a first end of said arm;
   wherein driving said arm in a first direction causes said first flange to translate and unwrap a segment of said strap from said liner, and translate said strap a distance around said liner circumference;
   wherein actuating said arm in a direction opposite said first direction causes said second flange to translate and unwrap a segment of said strap from said liner, and translate said strap a distance around said liner circumference.

3. A bypass air valve according to claim 2, wherein said arm further comprises:

a first outer bar;

a second outer bar; and a middle bar, disposed between said outer bars;

wherein said first flange is received between said second outer bar and said middle bar, and said second flange is received between said middle bar and said first outer bar;

wherein actuating said arm in a first direction causes said middle bar to contact and translate said first flange, thereby unwrapping a segment of said strap from said liner, and one or both of said biasing means and said first outer bar causes said strap to translate a distance around said liner circumference;

wherein actuating said arm in a direction opposite said first direction causes said middle bar to contact and translate said second flange, thereby unwrapping a segment of said strap from said liner, and one or both of said biasing means and said second outer bar causes said strap to translate a distance around said liner circumference.

4. A bypass air valve according to claim 3, wherein said arm further comprises a joint disposed between said first outer bar and said first end of said arm, wherein said joint accommodates misalignment between said driver and said strap.

5. A bypass air valve according to claim 1, wherein said strap further comprises a structural member extending along said length of said strap, thereby adding rigidity to said strap.

6. A bypass air valve according to claim 5, wherein said structural member includes an outer ring and a corrugated ring, said corrugated ring extending between said outer ring and said strap.

7. A bypass air valve according to claim 4, wherein said strap further comprises a structural member extending along said length of said strap, thereby adding rigidity to said strap.

8. A bypass air valve according to claim 7, wherein said structural member includes an outer ring and a corrugated ring, said corrugated ring extending between said outer ring and said strap.

9. A bypass air valve according to claim 1, wherein said means for biasing said first and second flanges comprises:

a spring; and a rod, having a capped end and an attachment means;

wherein said rod extends through said spring and said first and second flanges; and wherein said spring acts against one of said first or second flange and against one of said capped end or said attachment means of said rod, thereby biasing said first and second flanges toward one another.

10. A bypass air valve according to claim 9, wherein said selective actuator comprises:

an arm, said arm in communication with said strap; and a driver, pivotly attached to a first end of said arm;

wherein driving said arm in a first direction causes said first flange to translate and unwrap a segment of said strap from said liner, and translate said strap a distance around said liner circumference;

wherein actuating said arm in a direction opposite said first direction causes said second flange to translate and unwrap a segment of said strap from said liner, and translate said strap a distance around said liner circumference.

11. A bypass air valve according to claim 10, wherein said arm further comprises:

a first outer bar;

a second outer bar; and a middle bar, disposed between said outer bars;

wherein said first flange is received between said second outer bar and said middle bar, and said second flange is received between said middle bar and said first outer bar;

wherein actuating said arm in a first direction causes said middle bar to contact and translate said first flange, thereby unwrapping a segment of said strap from said liner, and one or both of said biasing means and said first outer bar causes said strap to translate a distance around said liner circumference;

wherein actuating said arm in a direction opposite said first direction causes said middle bar to contact and translate said second flange, thereby unwrapping a segment of said strap from said liner, and one or both of said biasing means and said second outer bar causes said strap to translate a distance around said liner circumference.

12. A bypass air valve according to claim 11, wherein said arm further comprises a joint disposed between said first outer bar and said first end of said arm, wherein said joint accommodates misalignment between said driver and said strap.

13. A bypass air valve according to claim 10, wherein said strap further comprises a structural member extending along said length of said strap, thereby adding rigidity to said strap.

14. A bypass air valve according to claim 13, wherein said structural member includes an outer ring and a corrugated ring, said corrugated ring extending between said outer ring and said strap.

15. A bypass air valve according to claim 12, wherein said strap further comprises a structural member extending along said length of said strap, thereby adding rigidity to said strap.

16. A bypass air valve according to claim 15, wherein said structural member includes an outer ring and a corrugated ring, said corrugated ring extending between said outer ring and said strap.

* * * * *